2,996,554
Patented Aug. 15, 1961

2,996,554
METHOD OF MAKING ARYL-SUBSTITUTED OLEFINS
George A. Olah, Stephen J. Kuhn, and Dennis G. Barnes, Sarnia, Ontario, Canada, assignors to The Dow Chemical Company, Midland, Mich., a corporation of Delaware
No Drawing. Filed Aug. 10, 1959, Ser. No. 832,491
20 Claims. (Cl. 260—651)

This invention concerns a method of making aryl-substituted olefins. It relates more particularly to the reaction of a saturated halo-alkaryl compound with an olefin and the subsequent dehydrohalogenation of the intermediate addition product to produce an aryl-substituted olefin. The invention also pertains to the method of making the intermediate halo-alkaryl compounds.

It is known to react or condense a halo-alkane or an olefin with an aromatic compound in the presence of a Friedel-Crafts catalyst to obtain a corresponding halo-alkaryl compound. For example, U.S. Patent No. 2,631,172 reacts 1,3-dichloro-3-methylbutane with benzene in the presence of aluminum chloride to produce 1-chloro-3-methyl-3-phenylbutane. U.S. Patent No. 2,485,017 reacts or condenses 1,3-dichloro-2-methylpropane with benzene in the presence of aluminum chloride to produce 1,3-dichloro-2-methyl-2-phenylpropane. U.S. Patent No. 2,533,053 reacts an olefin, e.g. propylene, with isobutyl chloride to produce 2-chloro-4,4-dimethylpentane.

It has now been found that an alpha-haloalkyl aromatic compound, e.g. alpha-haloethylbenzene, alpha-halocumene, or nuclear substituted derivatives thereof, can readily be reacted with an olefin to produce a corresponding halo-alkaryl addition compound by carrying out the reaction in the presence of certain Friedel-Crafts catalysts.

It has further been discovered that the halo-alkaryl addition compounds can readily be dehydrohalogenated, without separating them from the reaction mixture in which they are prepared, to produce the corresponding aryl-substituted olefins in good yield.

The invention provides a method for carrying out a new chemical reaction, namely, the reaction of an olefin with a saturated alpha-haloalkaryl compound to produce new halo-alkaryl addition compounds which are useful per se, e.g. as the active ingredient in spray solutions for the control of insects or which can readily be dehydrohalogenated to form correspondingly new aryl-substituted olefins useful for a variety of purposes, e.g. as intermediates in the preparation of new chemical compounds, as the active ingredient in spray solutions for the control of insects or in the preparation of alkenyl aryl sulfonates.

The alpha-haloalkaryl compounds to be employed as starting materials in the method of the invention can be alpha-chlorohydrindene or a halo-alkaryl compound having the general formula:

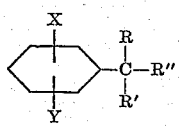

wherein R represents a halogen atom, i.e. a chlorine, bromine, fluorine or iodine atom, R' represents a member of the group consisting of hydrogen and the methyl radical, R" represents an alkyl radical, and X and Y each represent a member of the group consisting of hydrogen, halogen and alkyl radicals. Examples of suitable halo-alkaryl compounds are alpha-chloroethylbenzene, alpha-chloroethyltoluene, alpha-bromoethyltoluene, alpha-chloro-ethylxylene, alpha-bromoethylxylene, alpha-chloroethylisopropylbenzene, alpha - chloroethyl - tert.-butylbenzene, alpha-bromoethyl-tert.-butyl-benzene, alpha-chloro-ethylchlorobenzene, alpha - bromoethyldibromobenzene, alpha - chloroethyldichlorobenzene, alpha-chloro-n-propylbenzene, alpha-chloro-n-butylbenzene, alpha-chlorohydrindene and alpha-chlorocumene.

Suitable olefins to be employed in the method are dipentene, aliphatic olefins containing at least three carbon atoms in the molecule such as propylene, butylene, pentene, hexene, octene, isobutylene, diisobutylene, octadecene, isoprene, butadiene, etc., monoalkenyl aromatic hydrocarbons such as styrene, vinyltoluene, vinylxylene, isopropyl styrene, ethylvinylbenzene, alpha-methyl styrene and the like or nuclear substituted monoalkenyl aromatic hydrocarbons, e.g. chlorostyrene, chlorovinyltoluene, dichlorostyrene, 3,4-dichloro-alpha-methylstyrene, bromostyrene and fluorostyrene.

The condensation reaction of the alpha-halo-alkyl aromatic compound and the olefin can be carried out employing substantially equimolecular proportions of the reactants and in the presence of a mild Friedel-Crafts catalyst. The term "mild" as used herein pertains to Friedel-Crafts catalysts of the group consisting of zinc chloride, zinc bromide, zinc iodide, stannic iodide, stannic bromide and stannic chloride, as contrasted to the "strong" Friedel-Crafts catalysts such as aluminum chloride, aluminum bromide, ferric chloride, ferric bromide, hydrogen fluoride or boron trifluoride, which strong catalysts are not useful in the method of the invention because they promote dehydrohalogenation of the starting alpha-halo-alkyl compounds at the reaction temperatures. The catalysts can be employed in amount corresponding to from 0.5 to 5 percent by weight, based on the weight of the alpha-haloethyl aromatic compound initially used.

The addition reaction of the olefin with the alpha-haloalkyl aromatic compound can be carried out at temperatures between about 0° and 100° C., preferably from 20° to 80° C., and at atmospheric or substantially atmospheric pressure.

In practice, the addition reaction product is prepared by placing a charge of the alpha-haloalkyl aromatic compound, together with the mild Friedel-Crafts catalyst in the desired proportion in a suitable reaction vessel. The mixture is stirred and the olefin is added preferably portionwise or continuously, at about the rate it is consumed in the reaction while maintaining the mixture at reaction temperatures within the range of from 0° to 100° C. and below that which results in any appreciable decomposition of the addition product. This is readily determined by evolution of hydrogen halide from the reaction mixture. Upon completing the addition reaction, the intermediate halo-alkaryl addition compound can readily be dehydrohalogenated to produce a corresponding aryl-substituted olefin without separating it from the reaction mixture in which it was prepared by adding to the mixture an alkali such as sodium carbonate, potassium carbonate, sodium hydroxide, potassium hydroxide or a nitrogen-containing organic base such as pyridine, morpholine and the like, in amount sufficient to bind or neutralize the hydrohalic acid evolved, and heating the resulting mixture at temperatures up to 200° C. or higher at atmospheric or subatmospheric pressure such as to distill the aryl-substituted olefin product from the reaction mixture as it is formed. The product can be further purified in usual ways, e.g. by distillation.

In an instance where it is desired to recover the intermediate halo-alkaryl addition product it can be recovered by neutralizing the catalyst with an alkali, e.g. sodium hydroxide or potassium carbonate, and distilling said product from the reaction mixture, preferably under vacuum or at subatmospheric pressure.

The following examples illustrate ways in which the principle of the invention has been applied, but are not to be construed as limiting its scope.

Example 1

(A) A charge of 196.5 grams (1 mole) of 4-tert.-butyl alpha-chloroethylbenzene, a liquid boiling at 95°–96° C. at 3 millimeters' absolute pressure and having a refractive index and density of 1.5168 at 25° C., was placed in a glass reaction vessel equipped with a reflux condenser and stirrer. A charge of 2 grams of zinc chloride was added as catalyst. The mixture was stirred. A charge of isobutylene in amount of 56 grams (1 mole) was fed into the liquid mixture at temperatures between 20° and 70° C. over a period of 15 minutes. The mixture was stirred and heated at 70° C. for one hour longer. It was cooled to room temperature. A charge of 212 grams (2 moles) of sodium carbonate was added. The resulting mixture was heated at gradually increasing temperatures between 25° C. and 200° C. sufficient to dehydrohalogenate the intermediate reaction product and distill the hydrocarbon product from the mixture. The distillate was collected and redistilled. There was obtained 183 grams of 4-(4-tert.-butplphenyl)pentene-2 as a colorless liquid boiling at 105°–115° C. at 4 millimeters absolute pressure.

(B) A charge of 196.5 grams (1 mole) of 4-tert.-butyl-alpha-chloroethylbenzene was reacted with 70 grams (1 mole) of 2-methylbutene-2 at temperatures between 20° and 60° C. in the presence of 2 grams of zinc chloride as catalyst, employing procedure similar to that employed in part A above. The addition product was dehydrochlorinated with sodium carbonate as described above. There was obtained 198 grams of 2,3-dimethyl-4-(4-tert.-butyl-phenyl)-pentene-2 as a colorless liquid boiling at 105°–115° C. at 3 millimeters absolute pressure and having a refractive index $n_D^{25}$ 1.5085.

Example 2

A charge of 140.5 grams (1 mole) of alpha-chloroethylbenzene, together with 1 percent by weight of zinc chloride as catalyst, was placed in a glass reaction flask equipped with a reflux condenser and stirrer. The mixture was stirred and 56 grams (1 mole) of butene-1 was fed into the liquid over a period of 15 minutes while stirring and maintaining the mixture at temperatures between 20° and 50° C. The resulting mixture was stirred for one hour longer. No hydrogen chloride was evolved in the reaction. Thereafter, 212 grams (2 moles) of sodium carbonate was added. This mixture was heated at gradually increasing temperatures up to 200° C. to dehydrohalogenate the chlorohydrocarbon addition reaction product and distill the olefin hydrocarbon product from the mixture as it was formed. The distillate was collected and redistilled. There was obtained 136 grams of 2-phenyl-hexene-3 as a colorless liquid boiling at 70°–80° C. at 4 millimeters absolute pressure and having a refractive index $n_D^{25}$ 1.5262.

Example 3

A charge of 140.5 grams (1 mole) of alpha-chloroethylbenzene, together with 1 percent by weight of zinc chloride as catalyst was placed in a glass reaction flask equipped with a reflux condenser and stirrer. The mixture was stirred and reacted with 56 grams of isobutylene to form an intermediate 2-methyl-2-chloro-4-phenyl pentane product which was dehydrohalogenated without removing it from the reaction mixture, employing procedure similar to that employed in Example 2. There was obtained 152 grams of 2-methyl-4-phenyl-pentene-2 as a colorless liquid boiling at 70° C. at 3 millimeters' absolute pressure and having a refractive index $n_D^{25}$ 1.5069. The yield of said product was 95 percent based on the alpha-chloroethylbenzene initially used.

Similar results were obtained when zinc bromide, zinc iodide, and stannic chloride were employed as the catalyst in the addition reaction in place of the zinc chloride.

Example 4

A charge of 140.5 grams (1 mole) of alpha-chloroethylbenzene was reacted with 70 grams (1 mole) of 2-methylbutene-2 at temperatures between 20° and 50° C. in the presence of 1 percent by weight of zinc chloride as catalyst and the addition product was dehydrohalogenated, employing procedure similar to that employed in Example 2. There was obtained 156.5 grams of 2,3-dimethyl-4-phenyl-pentene-2 as a colorless liquid boiling at 78°–82° C. at 3 millimeters' absolute pressure.

Example 5

A charge of 140.5 grams (1 mole) of alpha-chloroethylbenzene was reacted with 112 grams (1 mole) of di-isobutylene at temperatures between 20° and 60° C. in the presence of 1 percent by weight of zinc chloride as catalyst. The addition product was dehydrohalogenated without separating it from the reaction mixture, employing procedure similar to that employed in Example 2. There was obtained 162 grams (0.75 mole) of 2-methyl-3-(tert.-butyl)-4-phenyl pentene-2 as a colorless liquid boiling at 100°–115° C. at 5 millimeters' absolute pressure.

Example 6

A charge of 140.5 grams (1 mole) of alpha-chloroethylbenzene was reacted with 252.5 grams (1 mole) of octadecene at temperatures between 60° and 100° C. in the presence of 1 percent by weight, based on the weight of the alpha-chloroethylbenzene, of zinc chloride as catalyst. The addition product was dehydrohalogenated without separating it from the reaction mixture employing procedure similar to that employed in Example 2. There was obtained 231.5 grams of 2-phenyl eicosene-3 as a colorless liquid boiling at 155°–165° C. at 3 millimeters' absolute pressure and having a refractive index $n_D^{25}$ 1.4602.

Example 7

A charge of 185 grams (1 mole) of alpha-bromoethylbenzene was reacted with 56 grams (1 mole) of isobutylene at temperatures between 20° and 50° C. in the presence of 1 percent by weight of zinc bromide as catalyst. The addition product was dehydrobrominated, without separtaing it from the reaction mixture in which it was prepared, by adding 212 grams of sodium carbonate and heating the resulting mixture to gradually increasing temperatures up to 200° C. while distilling the olefin hydrocarbon product from the mixture as it was formed. The distillate was collected and redistilled. There was obtained 142.5 grams of 2-methyl-4-phenyl-pentene-2 as a colorless liquid boiling at 70° C. at 3 millimeters' absolute pressure. The product was obtained in a yield of 89 percent, based on the alpha-bromoethylbenzene initially used.

Example 8

A charge of 124 grams (1 mole) of alpha-fluoroethylbenzene, together with 1 percent by weight of zinc chloride was placed in a glass reaction flask equipped with a reflux condenser and stirrer. The mixture was stirred and 42 grams (1 mole) of propylene was fed into the liquid over a period of 15 minutes while stirring and maintaining the mixture at temperatures between 20° and 60° C. The mixture was stirred for one hour longer. An addition compound of the propylene and the alpha-fluoroethylbenzene was obtained. A charge of 212 grams (2 moles) of sodium carbonate was added. The resulting mixture was heated at gradually increasing temperatures up to 200° C. sufficient to dehydrohalogenate the addition compound and distill the olefin hydrocarbon product from the reaction mixture as it was formed. There was 68.5 grams of 4-phenyl-pentene-2 as a colorless liquid boiling at 78°–85° C. at 6 millimeters' absolute pressure.

Example 9

A charge of 154.5 grams (1 mole) of alpha-chloroisopropylbenzene was reacted with 56 grams (1 mole) of isobutylene at temperatures between 0° and 30° C. in the presence of 1 percent by weight of zinc chloride, based on the weight of the alpha-chloroisopropylbenzene starting material, as catalyst to form the corresponding addition compound, employing procedure similar to that employed in Example 1. The addition compound was dehydrochlorinated in the presence of sodium carbonate employing procedure similar to that employed in Example 1. There was obtained 139 grams of 2,4-dimethyl-4-phenyl-pentene-2 as a colorless liquid boiling at 89°–93° C. at 4 millimeters' absolute pressure. The yield of said product was 80 percent based on the starting materials.

Example 10

A charge of 140.5 grams (1 mole) of alpha-chloroethylbenzene, together with 1.5 grams of zinc chloride as catalyst was placed in a glass reaction flask equipped with a reflux condenser and stirrer. The mixture was stirred. Butadiene-1,3 was introduced into the liquid in total amount corresponding to 54 grams (1 mole) over a period of 15 minutes while stirring and maintaining the mixture at temperatures between 20° and 70° C. After adding the butadiene, the mixture was stirred for a period of one hour longer. Thereafter, the catalyst was neutralized with sodium carbonate. The mixture was distilled. There was obtained 87.5 grams of 1-chloro-5-phenyl hexene-2 as a colorless liquid boiling at 100°–110° C. at 4 millimeters' absolute pressure and having a refractive index $n_D^{25}$ 1.5260.

Example 11

A charge of 140.5 grams (1 mole) of alpha-chloroethylbenzene was reacted with 68 grams (1 mole) of isoprene at temperatures between 20° and 30° C. in the presence of 1.5 grams of zinc chloride as condensation catalyst employing procedure similar to that employed in Example 10. There was obtained 117 grams of 1-chloro-2-methyl-5-phenyl hexene-2 as a colorless liquid boiling at 120°–140° C. at 5 millimeters' absolute pressure and having a refractive index $n_D^{25}$ 1.5271.

Example 12

A charge of 140.5 grams (1 mole) of alpha-chloroethylbenzene was reacted with 136 grams (1 mole) of dipentene at temperatures between 20° and 50° C. in the presence of 1.5 grams of zinc chloride as condensation catalyst to obtain the addition compound 2-chloro-4-phenyl-2-[4(1-methylcyclohexyl)]pentane. The addition compound was dehydrochlorinated by adding 212 grams (2 moles) of sodium carbonate to the reaction mixture and heating the resulting mixture at gradually increasing temperatures from room temperature up to 200° C. while distilling the olefin product from the mixture as it was formed. There was obtained 101 grams of (0.42 mole) of an olefin product consisting of 2-phenyl-X-[4(1-methylcyclohexyl)]pentene.

Example 13

A charge of 140.5 grams (1.0 mole) of alpha-chloroethylbenzene was reacted with 104 grams (1.0 mole) of styrene at a temperature of 50° C. in the presence of 1.5 grams of zinc chloride as catalyst employing procedure similar to that employed in Example 1 to obtain the addition compound 1,3 - diphenyl - 1 - chlorobutane. Without separating the addition compound from the reaction mixture, a charge of 212 grams (2.0 moles) of sodium carbonate was added and the resulting mixture was heated at gradually increasing temperatures up to 200° C. while distilling the olefin product from the mixture as it was formed in the dehydrohalogenation reaction. The olefin product was redistilled. There was obtained 145.5 grams (0.70 mole) of 1,3-diphenylbutene-1 as a colorless liquid boiling at 152°–158° C. at 5 millimeters' absolute pressure and having a refractive index $n_D^{25}$ 1.564.

Example 14

A charge of 140.5 grams (1.0 mole) of alpha-chloroethylbenzene was reacted with 173 grams (1.0 mole) of 2,5-dichlorostyrene in the presence of 1.5 grams of zinc chloride as catalyst at a temperature of 55° C. The addition reaction product 1-(dichlorophenyl)-1-chloro-3 - phenylbutane was dehydrogenated employing procedure similar to that described in Example 13. There was obtained 172 grams (0.62 mole) of 1-(2,5-dichlorophenyl)-3-phenyl-butene-1 as a liquid product boiling at 175–182° C. at 5 millimeters' absolute pressure and having a refractive index $n_D^{25}$ 1.5810.

Example 15

A charge of 140.5 grams (1.0 mole) of alpha-chloroethylbenzene was reacted with 118 grams (1.0 mole) of alpha-methyl styrene in the presence of 1.5 grams of zinc chloride as catalyst at a temperature of 50° C. The intermediate addition compound 2,4-diphenyl-2-chloropentane was dehydrohalogenated employing procedure similar to that employed in Example 13. There was obtained 144 grams (0.65 mole) of 2,4-diphenylpentene-2 as a colorless liquid boiling at 145–155° C. at 4 millimeters' absolute pressure having a refractive index $n_D^{25}$ 1.5668.

Example 16

A charge of 140.5 grams (1.0 mole) of alpah-chloroethylbenzene was reacted with 160 grams (1.0 mole) of 2-methyl-4-phenylpentene-2 at temperatures between 65° and 85° C. in the presence of 1.5 grams of zinc chloride as catalyst. The addition product 3-(1-chloro-1-methylethyl)-2,4-diphenylpentane was dehydrohalogenated employing procedure similar to that employed in Example 13. There was obtained 214 grams (0.81 mole) of 3-(1-phenyl-1-methylethyl)-4-methyl-4-phenylpentene-2 as a liquid product boiling at 155°–162° C. at 4 millimeters' absolute pressure having a refractive index $n_D^{25}$ 1.5590.

Example 17

A charge of 209.5 grams (1 mole) of dichloro-alpha-chloroethylbenzene was reacted with 104 grams (1 mole) of styrene at a temperature of 25° C. in the presence of 2 grams of zinc chloride as catalyst for a period of 20 minutes. Without separating the addition compound from the mixture in which it was prepared, there was added to the mixture 212 grams (2 moles) of sodium carbonate. The resulting mixture was heated at gradually increasing temperatures up to 200° C. while distilling the olefin product from the mixture as it was formed in the dehydrohalogenation reaction. The olefin product was redistilled. There was obtained 168 grams of 1-(dichlorophenyl)-3-phenylbutene-1 as a colorless liquid boiling at 168–172° C. at 5 millimeters' absolute pressure and having a refractive index $n_D^{25}$ 1.5812.

Example 18

A charge of 154.6 grams (1 mole) of alpha-chloro-n-propylbenzene and 2 grams of zinc chloride was placed in a glass reaction vessel equipped with a reflux condenser and stirrer. It was stirred and 56 grams (1 mole) of isobutylene was fed into the liquid at temperatures between 20° and 50° C. over a period of 20 minutes. Thereafter, 212 grams (2 moles) of sodium carbonate was added. The mixture was heated at gradually increasing temperatures to dehydrohalogenate the addition compound and distill the olefin product from the reaction mixture as it was formed. The olefin product was collected and redistilled. There was obtained 136 grams (0.78 mole) 2-methyl-4-phenylhexene-2 as a colorless liquid boiling at 94°–99° C. at 6 millimeters' absolute pressure.

Example 19

Alpha-chloro-n-butylbenzene was reacted with isobutylene in the presence of zinc chloride as catalyst, and the addition product was dehydrohalogenated to form the corresponding olefin product, employing procedure similar to that employed in Example 17. There was obtained 143 grams (0.76 mole) of 2-methyl-4-phenylheptene-2 as a colorless liquid boiling at 93°–103° C. at 6 millimeters' absolute pressure.

Example 20

Alpha-chlorohydrindene was reacted with isobutylene in the presence of zinc iodide as catalyst and the addition compound was dehydrohalogenated to form the corresponding olefin product, employing procedure similar to that employed in Example 17. There was obtained 72 grams (0.42 mole) of 2-methyl-4-indene-butene-2 as a colorless liquid boiling at 105°–108° C. at 8 millimeters' absolute pressure.

Example 21

A purpose of this example is to show a utility for the aryl-substituted olefins of the invention. A charge of 216 grams (1 mole) of 4-(4-tert.-butylphenyl)pentene-2, prepared by procedure similar to that described in Example 1, was added dropwise, with stirring of the resulting mixture, to 233 grams (2 moles) of chlorosulfonic acid at temperatures between 0° and 10° C. over a period of 20 minutes. The mixture was stirred for 30 minutes longer and was allowed to warm to room temperature. Thereafter, the mixture was poured over crushed ice and the resulting solution was mixed with 2.0 moles of sodium hydroxide and was warmed to 50°–60° C. The solution was saturated with sodium chloride. The product layer was separated and dried in a vacuum oven. The product was 2-pentene-4-tert.-butylbenzene sulfonic acid, sodium salt. The product had good surface active properties and was useful as a detergent.

Similar results are obtained when other of the aryl-substituted olefins prepared in the foregoing examples are sulfonated. The sulfonated compounds are useful as surface active agents and detergents.

We claim:

1. A method for carrying out the addition reaction of an olefin with an alpha-haloalkaryl aromatic compound to form a corresponding haloalkaryl addition compound of greater molecular weight, which method comprises reacting approximately equimolecular proportions of (1) an alpha-haloalkaryl compound having the general formula:

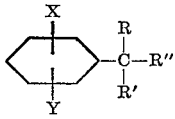

wherein R represents a halogen atom, R' represents a member of the group consisting of hydrogen and the methyl radical, R" represents an alkyl radical and X and Y each represent a member of the group consisting of hydrogen, halogen and alkyl radicals and (2) an olefin of the group consisting of dipentene, aliphatic monoolefins containing from 3 to 18 carbon atoms in the molecule, aliphatic conjugated diolefins containing from 4 to 6 carbon atoms in the molecule and monoalkenyl aromatic compounds having the general formula:

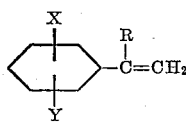

wherein R represents a member of the group consisting of hydrogen and the methyl radical and X and Y have the meaning given above, at temperatures between 0° and 100° C. in the presence of from 0.5 to 5 percent by weight, based on the weight of the alpha-haloalkaryl compound initially used, of a Friedel-Crafts catalyst of the group consisting of the chlorides, bromides and iodides of the elements zinc and tin.

2. A method as claimed in claim 1, wherein the olefin is isobutylene.

3. A method as claimed in claim 1, wherein the olefin is butadiene.

4. A method as claimed in claim 1, wherein the olefin is styrene directly attached to a carbon atom of the aromatic nucleus.

5. A method as claimed in claim 1, wherein the alpha-haloalkaryl compound is alpha-chloroethylbenzene.

6. A method as claimed in claim 1, wherein the alpha-haloalkaryl compound is alpha-bromoethylbenzene.

7. A method as claimed in claim 1, wherein the alpha-haloalkaryl compound is alpha-fluoroethylbenzene.

8. A method as claimed in claim 1, wherein the alpha-haloalkaryl compound is para-tert.-butyl-alpha-chloroethylbenzene.

9. A method as claimed in claim 1, wherein the alpha-haloalkaryl compound is alpha-chlorocumene.

10. A method as claimed in claim 1, wherein the Friedel-Crafts catalyst is zinc chloride.

11. A method as claimed in claim 1, wherein the Friedel-Crafts catalyst is stannic chloride.

12. A method for making an aryl-substituted olefin which method comprises reacting approximately equimolecular proportions of (1) a saturated alpha-haloalkyl aromatic compound having the general formula:

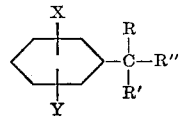

wherein R represents a halogen atom, R' represents a member of the group consisting of hydrogen and the methyl radical, R" represents an alkyl radical, and X and Y each represents a member of the group consisting of hydrogen, halogen and alkyl radicals, and (2) an olefin of the group consisting of dipentene, aliphatic monoolefins containing from 3 to 18 carbon atoms in the molecule, aliphatic conjugated diolefins containing from 4 to 6 carbon atoms in the molecule and monoalkenyl aromatic compounds of the benzene series having a single ethylenically unsaturated radical of the class consisting of the vinyl and the isopropenyl radicals directly attached to a carbon of the aromatic nucleus, at temperatures between 0° and 100° C. in the presence of from 0.5 to 5 percent by weight, based on the weight of the alpha-haloalkyl aromatic compound initially used, of a Friedel-Crafts catalyst of the group consisting of the chlorides, bromides and iodides of the elements zinc and tin, then without separating the intermediate halo-alkaryl addition compound from the reaction mixture in which it is prepared, adding to said reaction mixture an alkali in amount at least sufficient to neutralize the hydrohalic acid theoretically possible to be liberated upon splitting out of hydrohalic acid from the alkyl portion of said intermediate addition compound and dehydrohalogenating said intermediate addition compound by heating the resulting mixture at temperatures up to 200° C. under an absolute pressure such that the corresponding aryl-substituted olefin formed in the dehalogenation reaction distills from the reaction mixture at about the rate it is produced.

13. A method as claimed in claim 12, wherein the olefin is isobutylene.

14. A method as claimed in claim 12, wherein the olefin is butadiene.

15. A method as claimed in claim 12, wherein the alpha-haloalkaryl compound is alpha-chloroethylbenzene.

16. A method as claimed in claim 12, wherein the alpha-haloalkaryl compound is alpha-bromoethylbenzene.

17. A method as claimed in claim 12, wherein the alpha-haloalkaryl compound is alpha-fluoroethylbenzene.

18. A method as claimed in claim 12, wherein the alpha-haloalkaryl compound is para-tert.-butyl-alpha-chloroethylbenzene.

19. A method as claimed in claim 12, wherein the Friedel-Crafts catalyst is zinc chloride.

20. A method as claimed in claim 12, wherein the Friedel-Crafts catalyst is stannic chloride.

References Cited in the file of this patent

UNITED STATES PATENTS

| 2,485,017 | Schmerling | Oct. 18, 1949 |
| 2,631,172 | Schmerling | Mar. 10, 1953 |

OTHER REFERENCES

Fieser et al.: "Organic Chemistry," 1944 edition. Pages 58–59 relied on.